United States Patent [19]

Shimizu

[11] 4,174,053
[45] Nov. 13, 1979

[54] VACUUM BOTTLE HAVING A TILT RESPONSIVE CLOSURE

[75] Inventor: Masahiro Shimizu, Higashi-Osaka, Japan

[73] Assignee: Zojirushi Vacuume Bottle Co., Ltd., Osaka, Japan

[21] Appl. No.: 736,179

[22] Filed: Oct. 27, 1976

[30] Foreign Application Priority Data

Mar. 15, 1976 [JP] Japan ............................. 51-31905[U]

[51] Int. Cl.$^2$ .............................................. B67D 5/42
[52] U.S. Cl. .................................... 222/209; 222/131; 222/383
[58] Field of Search ..................... 222/131, 209, 400.8, 222/401, 402, 500, 385, 383; 137/38, 43

[56] References Cited

U.S. PATENT DOCUMENTS

| | | | |
|---|---|---|---|
| 2,223,256 | 11/1940 | Kross | 222/209 X |
| 2,954,904 | 10/1960 | Potoczky | 272/402.11 |
| 3,323,689 | 6/1967 | Elmore | 222/209 X |
| 3,840,036 | 10/1974 | Renk | 137/38 |
| 3,905,520 | 9/1975 | Nishioka | 222/209 |
| 3,972,340 | 8/1976 | Miller et al. | 137/38 |
| 3,994,359 | 11/1976 | Smitley | 137/38 X |
| 4,005,724 | 2/1977 | Courtot | 137/38 |
| 4,060,182 | 11/1977 | Kikuchi | 222/385 X |

FOREIGN PATENT DOCUMENTS 568748  11/1975  Switzerland ............... 222/209

*Primary Examiner*—Robert J. Spar
*Assistant Examiner*—Fred A. Silverberg
*Attorney, Agent, or Firm*—Armstrong, Nikaido, Marmelstein & Kubovcik

[57] ABSTRACT

A safety mechanism system for double vacuum bottle construction to prevent liquid contained within the inner bottle element from escaping when the system is upset or overturned and including a cover portion disposed directly above and in contact with the body portion of the bottle, a bellows to serve as a pump provided inside the cover with the lower portion of the bellows in communication with the inside part of the cover and in further communication by an air valve and air vent with the inner portion of an inside bottle of the double bottle vacuum system, with a cylinder in vertical arrangement with the bellows and inner bottle member and located within a plug member for the mouth of the inner bottle, and adjacent to the cylinder a chamber connected by apertures to the inside of the inner bottle, as well as a receiving portion adjacent to the cylinder and in vertical relation therewith and containing therein blades projected therefrom and having a closing element adapted to cooperate with said receiving portion and the blades for opening and closing the receiving portion in contact with a liquid-draw-up pipe and a liquid pouring pipe such that, in operation, the weight and arrangement of the closing element is so oriented as to function in a manner to permit passage of a liquid due to pressure exerted thereon unless the system is upset or overturned.

2 Claims, 2 Drawing Figures

VACUUM BOTTLE HAVING A TILT RESPONSIVE CLOSURE

BACKGROUND OF THE INVENTION

The present invention relates to a safety mechanism, which is adapted to prevent the liquid on the inside bottle of a vacuum bottle system from being poured outside when the vacuum bottle has been upset. In the past, such mechanisms have usually been mounted in the lower end of a liquid-draw-up pump associated with the vacuum bottle. Due to the larger character and shape of the lower end of the liquid-draw-up pipe, there were possibilities of breakage of the inside bottle, since that portion of the pipe makes contact with the inside bottle (double vacuum bottle system) during the engagement and disengagement of the plug. The present invention has advantages over the prior system in that the safety mechanism pertaining to the upset or overturned position of the vacuum bottle is built-in on the inside of the plug and the lower end of the liquid-draw-up pipe remains in the same shape; that is, namely, smaller than that of the conventional pipe. Thus, no possibilities of breakage of the inside bottle exist, it being protected during the engagement and disengagement of the plug.

The primary object of the present invention is to provide a safety mechanism which overcomes the problems and deficiencies associated with double bottle vacuum systems in the past and which are related to the present system and constructions.

Another object of the present invention is to provide a safety mechanism in combination with the other structural features of a double bottle vacuum system which includes an inner bottle with a pressure source and a plug for the opening of the inner bottle containing a combination of structural features designed to cooperate in preventing the release of liquid when the system is overturned or upset.

A still further object of the present invention is to provide a safety mechanism for a double bottle vacuum system which is adaptable and capable of functioning with a variety of sizes and shapes of vacuum bottles arrangements within the scope of the construction of the inner bottle.

Yet another object of the present invention is to provide a device of the class indicated which is capable of the functions referred to and which is based upon simple principles of gravity and pressure and mechanical orientation, and wherein the plug for an opening in the inner bottle of the double bottle vacuum system contains a pipe for drawing up the liquid and a receiving portion attached to the upper end of the pipe with an obstruction member designed to open and close the aperture so as to permit or restrict the flow of liquid depending on the position of the system.

Other objects will appear hereinafter.

SUMMARY OF THE INVENTION

In accordance with the present invention, a safety mechanism for use with a double bottle vacuum system is provided and includes a cover portion containing therein a bellows which is in communication by an air valve and an air vent with the plug element designed to close the opening at the mouth of the inner bottle of the system and includes, within that plug element, a chamber in communication with the inside of the inner bottle by means of air ports and adjacent to that chamber a cylinder in communication with a liquid pouring pipe conveying liquid to the outside, in further communication with a liquid-draw-up pipe located inside the inner bottle and having at the upper extremity thereof, a receiving portion containing a closing element adapted for operation in conjunction with blades projected from the inside of the receiving portion so that when the system is upset or overturned, a closing element to obstruct the flow of liquid but which is released when the system is in the upright position in response to the exertion of pressure upon the liquid on the inside of the inner bottle from the bellows pump.

BRIEF DESCRIPTION OF THE DRAWINGS

For a more complete understanding of the reference invention, accompanied drawings show one embodiment of a vacuum bottle in accordancd with the present utility model.

Figure 1:
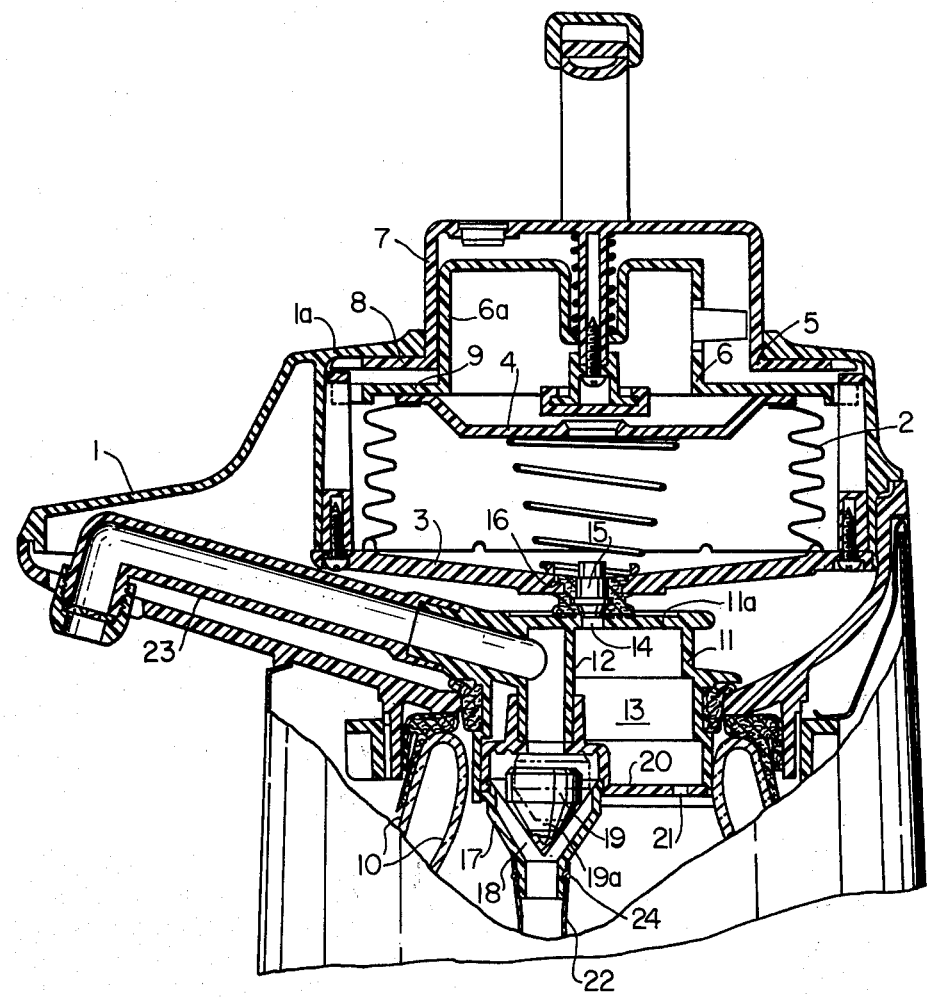
FIG. 1 is a partially broken-away view of the vacuum bottle.

One embodiment of the present device will be described hereinafter with reference to accompanied drawings.

DETAILED DESCRIPTION OF THE DRAWINGS

Numeral 1 is a hollow cover which is disposed directly over the body of the vacuum bottle. A bellows 2, which serves as a pump, is provided inside the cover 1. The bellows is communicated, in its lower portion, with an air port in the lower wall 3 of the cover 1, and is provided, on its top portion, with a top 4. Pushers 5 and 6 are disposed above the bellows 2, with the pusher 5 having a convex-shaped portion 7 projected upwardly through an opening provided in a top wall 1a inside the cover 1 so that the outward face of flange 8 as formed on the lower end of the pusher 5 comes into contact with the inner face on the top wall 1a of the cover 1. Also, the pusher 6 has a convex-shaped portion 6a which is engaged inside the convex-shaped portion 7 of the pusher 5 so that the inner face of the outward flange 9 formed in the lower end of the pusher 6 comes into contact with the top face of the top 4 on the bellows 2. The vertical motion of the pusher 5 and pusher 6 with respect to the cover 1 and the bellows 2 results in the bellows moving vertically up and down to function as a pump. Air is fed into the inside bottle 10 through a valve 15 so that liquid may be poured outside through a liquid pouring pipe 23 by exerting pressure on the liquid inside due to the operation of the pusher 5 and 6 and the bellows 2.

A cylinder 12 is provided vertically on a side within a hollow, bottomless plug 11 (FIG. 1), which is engaged with the mouth portion formed by the walls at the top of the inside bottle 10. Chamber 13 is provided on one side within the hollow bottomless plug 11. The chamber 13 is separated from cylinder 12. An air vent 14 is provided in the plug-type top portion 11a of the chamber 13. The air vent 14 communicates, though a cylindrical packing 16, with a valve 15 provided in the lower wall 3 of the cover 1.

A conical-shaped receiving portion 17 is connected with the lower portion of the cylinder 12. Several blades 18 are projected inwardly of the receiving portion 17 and are on periphery of the receiving portion 17.

A closing element 19 is placed in contact with the blades 18, and is provided, on the lower portion thereof with an engaging element 19a.

The closing element 19 is made of metal, porcelain, synthetic resins, or similar material. As the case may require, it should be set at a predetermined weight.

The chamber 13 is provided with a bottom portion 20 interrupted in its continuity only by the ports 21 hereinafter referred to and the receiving portion 17. Optional numbers of small ports 21 may be provided in the bottom portion 20 to communicate the interior of chamber 13 and the interior of the inside bottle 10.

A liquid-draw-up pipe 22 is connected to the lower part of the receiving portion 17 and extends vertically therefrom close to the bottom portion (not shown) of the inside bottle 10.

Referring more particularly to the drawings, numeral 23 is a liquid pouring pipe and numeral 24 is a tightening ring.

Figure 2:
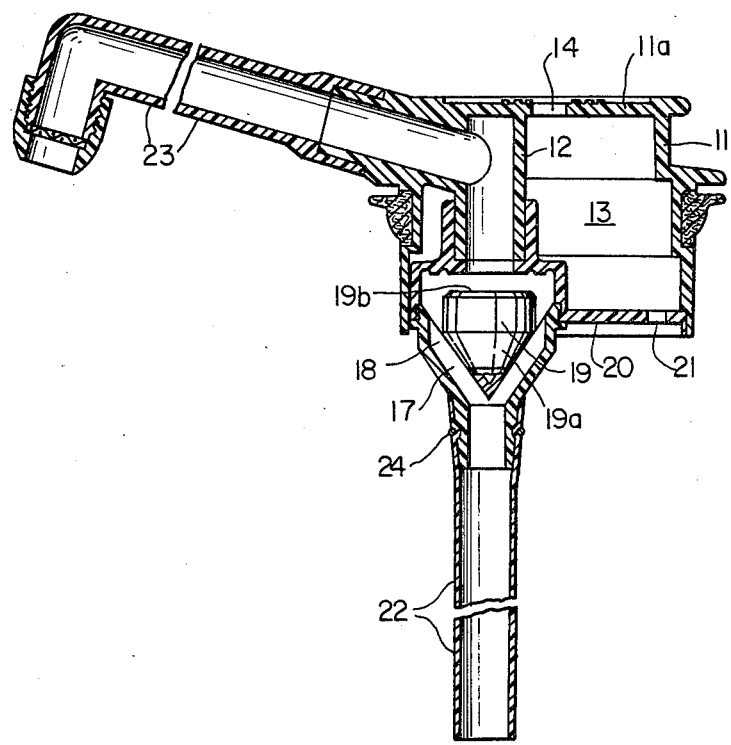
FIG. 2 is a sectional view showing a portion of the plug.

When a vacuum-bottle stands on its base in a vertically up-right position, the engaging portion 19a of the closing element 19 is located, due to the weight thereof and gravity, upon the blades 18 of the receiver 17 (illustrated by the solid lines in FIG. 2). Upon operation of the pumping function through the vertical movement of the bellows 2, air travels into the vacant area located inside the plug 11 through the air valve 15 and vent 14, and goes into the inside bottle 10 through small ports 21 in the bottom cover 20, thus pushing the liquid level inside the bottle 10 and causing the compressed liquid to pass between the blades of the receiving portion 17 from the liquid-draw-up pipe 22 so that the liquid may be poured outside through the liquid pouring pipe 23.

When the vacuum bottle has been upset or overturned by mistake, the closing element 19 slides due to any impact and the weight thereof comes into contact with blades 18 as indicated by the phantom lines of FIG. 1. The top face of the closing element obstructs the lower open end of the cylinder 12 to prevent the liquid in the inside bottle from leaking outside.

From the foregoing, it may be seen that what has been provided is a useful device in the form of a safety mechanism, in combination with the structural features of a double bottle vacuum system, which operates in relation to the inner bottle to prevent the inadvertent or accidental escape of liquid when the system is upset or overturned.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims rather then by the foregoing description, and all changes which come within the meaning and range of equivalency of the claims are, therefore, intended to be embraced therein.

What is claimed is:

1. A vacuum bottle manually operated safety pump comprising:
    a cover portion, said cover portion including a top portion, said top portion including a centrally positioned horizontally extending aperture;
    an outer push element, said outer push element including a radially outwardly extending flange, said radially outwardly extending flange being adapted to abut an inner face of said top portion adjacent the horizontally extending aperture;
    an inner push element, said inner push element being positioned partially within said outer push element, said inner push element being operatively connected with said outer push element;
    a pressure means, said pressure means comprising a bellows having a horizontal top wall, a horizontal bottom wall and a flexible side wall interconnecting said top and bottom walls, said top wall being operatively connected to said inner push element, said bottom wall including a centrally positioned opening communicating with the interior of said bellows:
    a plug element, said plug element comprising a horizontally extending top plug wall having a centrally positioned aperture, a plug bottom wall spaced from said plug top wall, said plug bottom wall including a plurality of ports, said ports providing fluid communication between interior of said bellows and the interior of said vacuum bottle and a chamber formed between said upper and lower plug walls;
    valve means, said valve means being positioned between said centrally positioned opening in said bellows bottom wall and said centrally positioned aperture in said top plug wall for providing an air-tight connection between said bellows interior and said plug element chamber;
    a vertically extending cylindrical member within said plug element separated from said chamber;
    a receiving portion formed in a lower portion of said cylindrical portion;
    a liquid draw-up tube positioned within said vacuum bottle, said draw-up tube having an upper end in fluid-tight communication with said receiving portion of said cylindrical member;
    a liquid discharge outlet, an interior end of said discharge outlet being in fluid-tight connection with an upper portion of said cylindrical member and an exterior end of said discharge outlet communicating to the exterior of said vacuum bottle;
    closure means positioned between said cylindrical member lower portion and said draw-up tube upper end, said closure means comprising a vertically positioned inverted truncated cone element having a cylindrical neck portion formed as a continuous extension of the lower end thereof for mounting said draw-up tube upper end, and a radially inwardly extending horizontal upper wall having a central aperture formed therein, said cylindrical neck and said truncated cone upper wall aperture being axially aligned with said vertically extending cylindrical member, and a cooperating inverted cone-shaped closure element movable relative to said inverted truncated cone element, said closure element having a horizontally extending upper face, wherein said vacuum bottle is in an upright position fluid is permitted to flow up said draw-up tube and through said closure means and vertically extending cylindrical member and out said liquid discharge outlet upon manual depression of said outer push element and when said vacuum bottle is in an inverted position said closure element horizontally extending upper face seats against said truncated cone upper face thereby fluidly sealing said truncated cone upper face aperture and preventing the flow of fluid to said vertically extending cylindrical member.

2. A vacuum bottle manually operated safety pump as claimed in claim 1, wherein said vertically positioned inverted truncated cone element further comprises a plurality of inwardly projecting blades for supporting the inverted cone-shaped closure element when said vacuum bottle is in an upright position, spacing between said blades permitting the flow of liquid therebetween.

* * * * *